US010491621B2

(12) United States Patent
Ground et al.

(10) Patent No.: US 10,491,621 B2
(45) Date of Patent: Nov. 26, 2019

(54) WEBSITE SECURITY TRACKING ACROSS A NETWORK

(71) Applicant: INTERNATIONAL BUSINESS MACHINES CORPORATION, Armonk, NY (US)

(72) Inventors: James C. Ground, Wappingers Falls, NY (US); David F. Hans, Castleton, NY (US); Ronald E. Van Buskirk, Nederland, CO (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 175 days.

(21) Appl. No.: 15/240,404

(22) Filed: Aug. 18, 2016

(65) Prior Publication Data

US 2018/0054456 A1 Feb. 22, 2018

(51) Int. Cl.
*G06F 21/56* (2013.01)
*G06F 21/55* (2013.01)
*H04L 29/06* (2006.01)
*G06F 21/51* (2013.01)

(52) U.S. Cl.
CPC ................ *H04L 63/1433* (2013.01)

(58) Field of Classification Search
None
See application file for complete search history.

(56) References Cited

U.S. PATENT DOCUMENTS

| 9,152,384 | B2 | 10/2015 | Sahoo | |
|---|---|---|---|---|
| 9,235,723 | B2 | 1/2016 | Sirohi | |
| 2002/0178383 | A1* | 11/2002 | Hrabik | H04L 63/1416 726/4 |
| 2012/0036110 | A1* | 2/2012 | Byrne | G06F 17/30289 707/687 |
| 2012/0084866 | A1* | 4/2012 | Stolfo | G06F 21/554 726/25 |

(Continued)

OTHER PUBLICATIONS

A survey of coordinated attacks and collaborative intrusion detection. Zhou et al. Computer and Security. (Year: 2010).*

(Continued)

*Primary Examiner* — Venkat Perungavoor
(74) *Attorney, Agent, or Firm* — Teddi Maranzano, Esq.; Kevin P. Radigan, Esq.; Heslin Rothenberg Farley & Mesiti P.C.

(57) ABSTRACT

Website security tracking is provided which includes, for instance, collecting, by a processor, event-specific information related to a suspicious event at a website. The collecting includes executing at least one security tracking module integrated into website code of the website to store the event-specific information. The website is one website of multiple websites of a network. The tracking method also includes providing by the website an indication of the suspicious event and the collected event-specific information to an analytics system external to the website. The analytics system is to receive indications of any suspicious events from the multiple websites and determine, based at least in in part on collected event-specific information related to the suspicious events, a confidence level of whether the suspicious event is part of a common security attack on the network.

20 Claims, 8 Drawing Sheets

(56) References Cited

U.S. PATENT DOCUMENTS

| | | | |
|---|---|---|---|
| 2012/0324418 | A1 | 10/2012 | Fallon |
| 2013/0014253 | A1* | 1/2013 | Neou ................. H04L 63/1441 726/22 |
| 2013/0298192 | A1* | 11/2013 | Kumar, Sr. ............. G06F 21/52 726/3 |
| 2014/0215621 | A1 | 7/2014 | Xaypanya et al. |
| 2015/0106867 | A1* | 4/2015 | Liang ................. H04L 63/1433 726/1 |
| 2016/0044054 | A1* | 2/2016 | Stiansen ............. H04L 63/1416 726/24 |
| 2016/0065613 | A1* | 3/2016 | Cho ...................... G06F 16/951 726/23 |
| 2016/0078229 | A1* | 3/2016 | Gong ................... G06F 21/577 726/24 |
| 2016/0088015 | A1* | 3/2016 | Sivan ................... G06F 16/986 726/23 |
| 2016/0226900 | A1* | 8/2016 | Fajardo Verano ...... G06F 21/55 |
| 2016/0301709 | A1* | 10/2016 | Hassanzadeh ...... H04L 63/1433 |
| 2016/0371507 | A1* | 12/2016 | Jakobsson ............... H04L 63/04 |

OTHER PUBLICATIONS

Alert correlation in collaborative intelligent intrusion detection systems—A survey. Elhoush et al. Applied Soft Computing. (Year: 2011).*

An Analysis of Information Security Event Managers and the Data Extracted for Detecting Hidden Threats. Thakur et al. (Year: 2016).*

Rajaraman et al., "Reliability and Maintainability Related Software Coupling Metrics in C++ Programs", Proceedings of Software Reliability Engineering, 3rd International Symposium on IEEE (9 pages).

Cai et al., "Component-Based Software Engineering: Technologies, Development Frameworks, and Quality Assurance Schemes", Software Engineering Conference, ASPEC 2000 (8 pages).

Johnson, Rod, "J2EE Development Frameworks", Computer, IT Systems Perspectives, vol. 38.1 (Jan. 2005) (pp. 107-110).

Livshits et al., "Using Web Application Construction Frameworks to Protect Against Code Injection Attacks", Proceedings of the 2007 Workshop on Programming Languages & Analysis Security (PLAS07) (Jun. 14, 2007) (9 pages).

Erlingsson et al., "End-to-End Web Application Security", HotOS 2007 (7 pages).

Weinberger et al., "A Systematic Analysis of XSS Sanitization in Web Application Frameworks", Computer Security, ESORICS 2011, LNCS 6879, Springer-Verlag Berlin Heidelberg (2011) (pp. 150-171).

IIBM, "zArchitecture Principles of Operation", IBM Publication No. SA22-7832-10, Mar. 2015.

IBM, "Power ISA", Version 2.078, International Business Machines Corporation, Apr. 9, 2015.

* cited by examiner

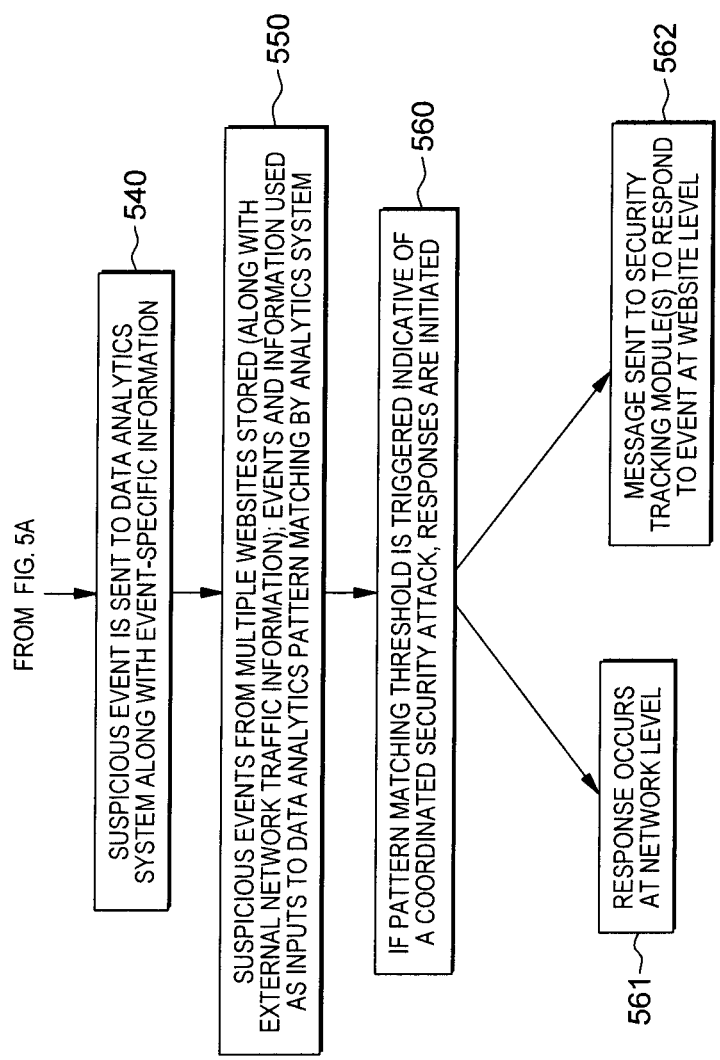

WEBSITE SECURITY TRACKING ACROSS A NETWORK

BACKGROUND

A website may be accessible by a public internet protocol (IP) network, such as the internet, or a private local area network (LAN), by referencing a uniform resource locator (URL) that identifies the site. Publically accessible websites may collectively constitute the World Wide Web, while private web sites are typically part of an intranet. A website is typically supported by one or more web servers.

Website, or web server, security is important for any organization that has a physical or virtual web server connected to the internet. Typically, a layered defense is employed, which may be especially important for organizations with customer-facing web sites.

The ability to provide enhanced website security processing and functionality to an organization is an area of interest and continued research for, for instance, establishing commercial advantage in the industry.

SUMMARY

The shortcomings of the prior art are overcome and additional advantages are provided through the provision of a method which includes: collecting, by a processor, event-specific information at a website relating to a suspicious event at the website, the collecting including executing at least one security tracking module integrated into website code of the website to store the event-specific information at the website, the website being one website of multiple websites of a network; and providing, by the website an indication of the suspicious event, and the collected event-specific information, to an analytics system external to the website, the analytics system to receive indications of suspicious events from the multiple websites and to determine, based at least in part on collected event-specific information relating to the suspicious events, a confidence level whether the suspicious event is part of a common security attack against the network.

In another aspect, a system of website tracking is provided which includes a memory, and a processing circuit communicatively coupled with the memory. The system performs a method, which includes: collecting event-specific information at a website relating to a suspicious event at the website, the collecting including executing at least one security tracking module integrated into website code of the website to store the event-specific information at the website, the website being one website of multiple websites of a network; and providing by the website an indication of the suspicious event, and the collected event-specific information, to an analytics system external to the website, the analytics system to receive indications of suspicious events from the multiple websites and determine, based at least in part on collected event-specific information relating to the suspicious events, a confidence level of whether the suspicious event is part of a common security attack against the network.

In a further aspect, a computer program product is provided for website security tracking. The computer program product includes a computer readable storage medium readable by a processing circuit and storing instructions for execution by the processing circuit for performing a method, which includes: collecting event-specific information at a website relating to a suspicious event at the website, the collecting including executing at least one security tracking module integrated into website code of the website to store the event-specific information at the website, the website being one website of multiple websites of a network; and providing by the website an indication of the suspicious event and the collected event-specific information to an analytics system external to the website, the analytics system to receive indications of suspicious events from the multiple websites and determine, based at least in part on collected event-specific information relating to the suspicious events, a confidence level of whether the suspicious event is part of a common security attack against the network.

Additional features and advantages are realized through the techniques of the present invention. Other embodiments and aspects of the invention are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

FIGS. 5A & 5B depict a more detailed embodiment of a process for website security tracking within a network, in accordance with one or more aspects of the present invention;

DETAILED DESCRIPTION

Figure 1:
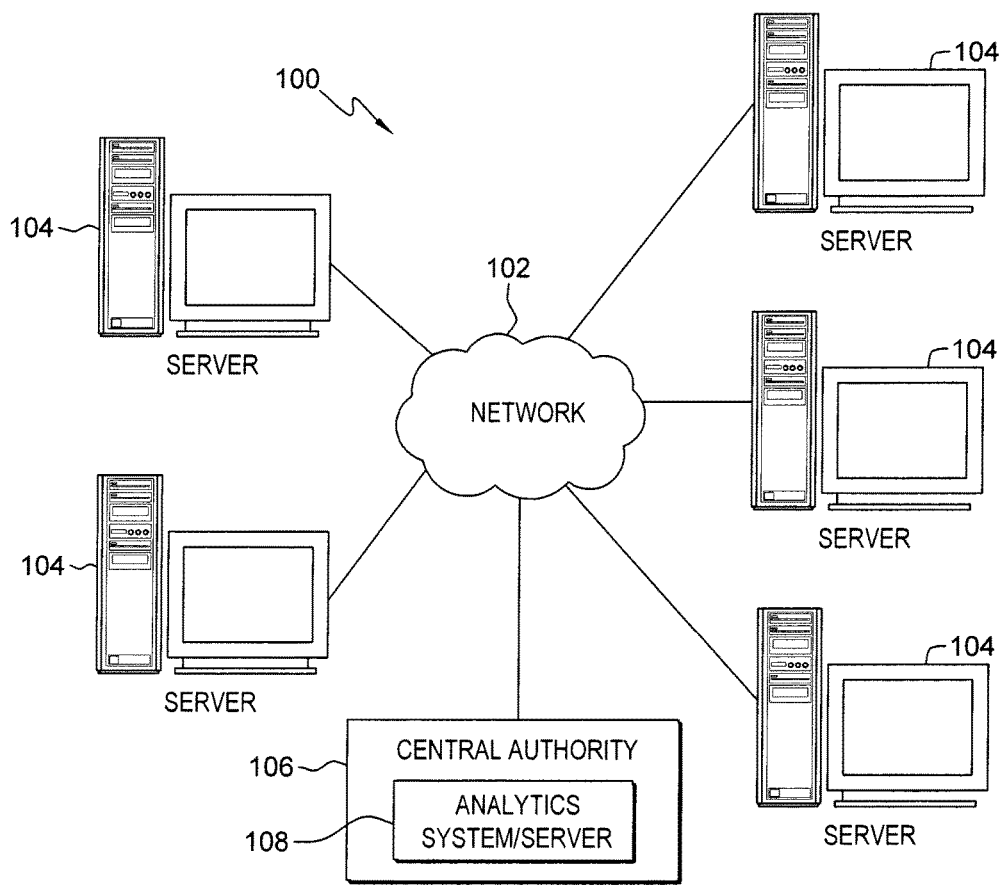
FIG. 1 depicts one embodiment of a network of data processing systems, such as web servers, which may implement website security tracking, in accordance with one or more aspects of the present invention.

As noted, the ability to provide enhanced website security processing and functionality within a network remains an area of great interest and continued research for, for instance, establishing commercial advantage in the industry. For instance, one problem with website security today is that the current approach for many websites is to respond to a possible security attack by simply blocking the attack. So, for instance, with an injection-type attack, such as a structured query language (SQL) injection-type attack, any input data received at the affected website will be cleansed so that the injection-type attack becomes harmless before being forwarded within the network. However, the information from the injection-type attack is potentially valuable in, for instance, determining whether there is a common, network-wide security attack, rather than a one-time suspicious event or attack at one website. Currently, many website development frameworks are available which block or prevent various types of security attacks. However, the information from the attacks is typically discarded, or to the extent stored, may be only partially held in a log file at the affected website. There is conventionally no real-time correlation of any event-specific information across websites of, for instance, an enterprise's network using today's website development frameworks.

Another issue with website security today is that many developers do not view security as a high priority. Obtaining a working website is often challenging enough. For instance, the look and feel of the website, its usability and accessibility are all important goals that compete with the goal of making a website secure. Often, security is provided on a "good enough" basis for many websites. As mentioned, there are website development frameworks that implement security automatically. However, these website security functions are typically not leveraged across an organization's network to improve overall network security. For instance, they may be limited to a single aspect of security, such as blocking an attack, without any other type of function.

Generally stated, disclosed herein are methods, systems, and computer program products which seek, in part, to address the above-noted concerns with exiting website frameworks and security procedures. For instance, in one or more aspects, security data, referred to herein as "event-specific information at the website", such as internal website data relating to a suspicious event, is captured at the time of blocking the event at the website using available security code or security service. Advantageously, one or more security tracking modules, such as security code libraries, may be integrated into a website framework, for instance, in conjunction with a security service. This allows the various features described herein to be readily integrated by a website designer into a website's code. For instance, security libraries implementing website security tracking described herein may be integrated into the website's code so that internal relevant information about any suspicious event or attack at the website may be stored at the website.

Advantageously, by providing one or more security tracking modules, such as security libraries, as part of, for instance, a website's framework, it is possible to readily update the website's security code with the most up-to-date security tracking modules to, for instance, address newly uncovered type of security attacks or, for instance, to collect new or additional event-specific information internal to a website relating to a type of suspicious event. The security tracking aspects described herein may be provided as library modules to a web site developer within an organization, and the developer may simply receive instructions on how to integrate the security tracking modules or the code library into the website code. The security tracking modules may also be incorporated as part of a website platform update facility, in order that any new security threats are discovered, and the security tracking modules may be automatically updated.

In another aspect, the internally stored event-specific information at the website relating to a suspicious event may be shared with a central authority or analytics system, such as a central server of an organization's network, which may compare or correlate multiple suspicious events across multiple websites of a network, as well as the collected event-specific information retrieved internally from the websites relating to the multiple suspicious events. The analytics system may, for instance, identify a confidence level by patterning-matching across websites the multiple suspicious events and/or the collected event-specific information to determine whether, for instance, the confidence level for two or more websites exceeds a set threshold indicative of a common security attack against the organization's network.

In certain implementations, the security tracking modules may perform security functions, such as cross-site scripting (XSS)-type filtering or structured query language (SQL) injection-type filtering, while other security tracking modules may be provided to monitor internal functions of the website to look for a suspicious event or behavior. As noted, the one or more security tracking modules may report any suspicious event data and the collected event-specific information thereon from the website back to the central authority, or analytics system, on a regular basis, or when queried. The analytics system may receive suspicious events from multiple websites and determine, based at least in part on the collected event-specific information from those websites, whether the events are related as part of a common security attack against the network.

An advantage of the website security tracking approach described herein is that a website developer does not need to have extensive knowledge about website security. The developer only require general background knowledge on website development, and be instructed on how to incorporate each security tracking module into the website code. Another advantage is that, not only are security attacks deterred at a website, but the information from the suspicious event or website attack is gathered at the website, and provided to a central authority, such as an analytics system, in order to correlate information across websites of an organization's network. Note in this regard, that a website is assumed to run atop one or more web servers, which are integrated into the network of, for instance, an organization, such as a business enterprise.

Generally stated, disclosed herein are methods, systems, and computer program products for facilitating website security tracking, that is, as an enhancement to a conventional security code or service provided to block an attack. For instance, a method is provided which includes collecting, by a processor or processing circuit, event-specific information at a website relating to a suspicious event at the website. The collecting of the event-specific information may include executing at least one security tracking module integrated into website code of the website to internally store the event-specific information at the website relating to the suspicious event, where the website is one website of multiple websites of a network. Further, the method may include providing, by the website, an indication of the suspicious event (such as the suspicious event itself), as well as the collected event-specific information, to an analytics system or server external to the website. The analytics system may receive indications of suspicious events from the multiple websites and determine, based at least in part on the collected event-specific information, a confidence level of whether the suspicious is part of a common security attack against the network.

By way of example, where the suspicious event at the website is an injection-type attack at the website, the collecting may include internally collecting uncleansed input data of the injection-type attack as, at least in part, the event-specific information. In another example, where the suspicious event at the website is a cross-site scripting-type attack, the collecting may include internally collecting uncleansed input data of the cross-site scripting-type attack as, at least in part, the event-specific information. As another example, where the suspicious event at the website is a session hijacking-type attack, the collecting may include internally collecting an Internet Protocol (IP) address or session identifier (ID) mismatch data of the session hijacking-type attack as, at least in part, the event-specific information. In still another example, where the suspicious event at the website is a brute-force password-type attack, the collecting may include internally collecting credentials associated with the brute-force password-type attack as, at least in part, the event-specific information. In a further example, where the suspicious event at the website is a cross-site request forgery-type attack, the collecting may include internally collecting an incorrect token of the cross-site request forgery-type attack as, at least in part, the event-specific information. In one or more implementations, where the suspicious event at the website is a remote code execution-type attack, the collecting may include internally collecting remote procedure call (RPC) commands of the remote code execution-type attack as, at least in part, the event-specific information. Based on the information provided herein, those skilled in the art will understand that further event-specific information may be internally collected at the website, either in combination with the above-noted information, or may alternatively be collected based upon the type of suspicious event. The above-noted events are provided by way of example only, and not by way of limitation.

In one or more embodiments, the method may include collecting the event-specific information relating to the multiple suspicious events at multiple websites. This collecting may include executing at least one security tracking module integrated into website code of each website of the multiple websites to store at the multiple websites the respective event-specific information relating to the multiple suspicious events. The multiple websites may then provide indications of the suspicious events and the collected event-specific information to the analytics system. The analytics system may identify, for instance, by pattern-matching at least some of the multiple suspicious events and/or the collected event-specific information from the multiple websites, whether at least two suspicious events of the multiple suspicious events are related as part of the common security attack against the network.

As an enhancement, in one or more embodiments, the method may include responding to the at least two suspicious events at a network level based on the analytics system determining that the at least two suspicious events are part of the common security attack against the network. Alternatively, the method may include responding to the at last two suspicious events by the respective websites receiving those events based on the analytics system determining that the at least two suspicious events are part of the common security attack against the network. For instance, in one or more embodiments, how the website responds to the suspicious activity may vary, depending upon whether the suspicious event is highly correlated to other suspicious events in other websites of the network, indicative of a more comprehensive common security attack against the network.

In one or more implementations, the at least one security tracking module may include at least one security library module integrated into the website code. The security library module(s) may perform, at least in part, an action such as, for instance, providing a security function responsive to the suspicious event, or monitoring internal functions of the website to, for instance, identify the suspicious event.

In one or more embodiments, the collecting of the event-specific information at the website may occur internally at the website before the website passes any cleansed packets based on the suspicious event on within the network. In one or more implementations, the suspicious event may include an associated user identification (ID), and the analytics system may determine, based at least in part on the user ID, whether the suspicious event is part of the common security attack against the network.

Figure 2:
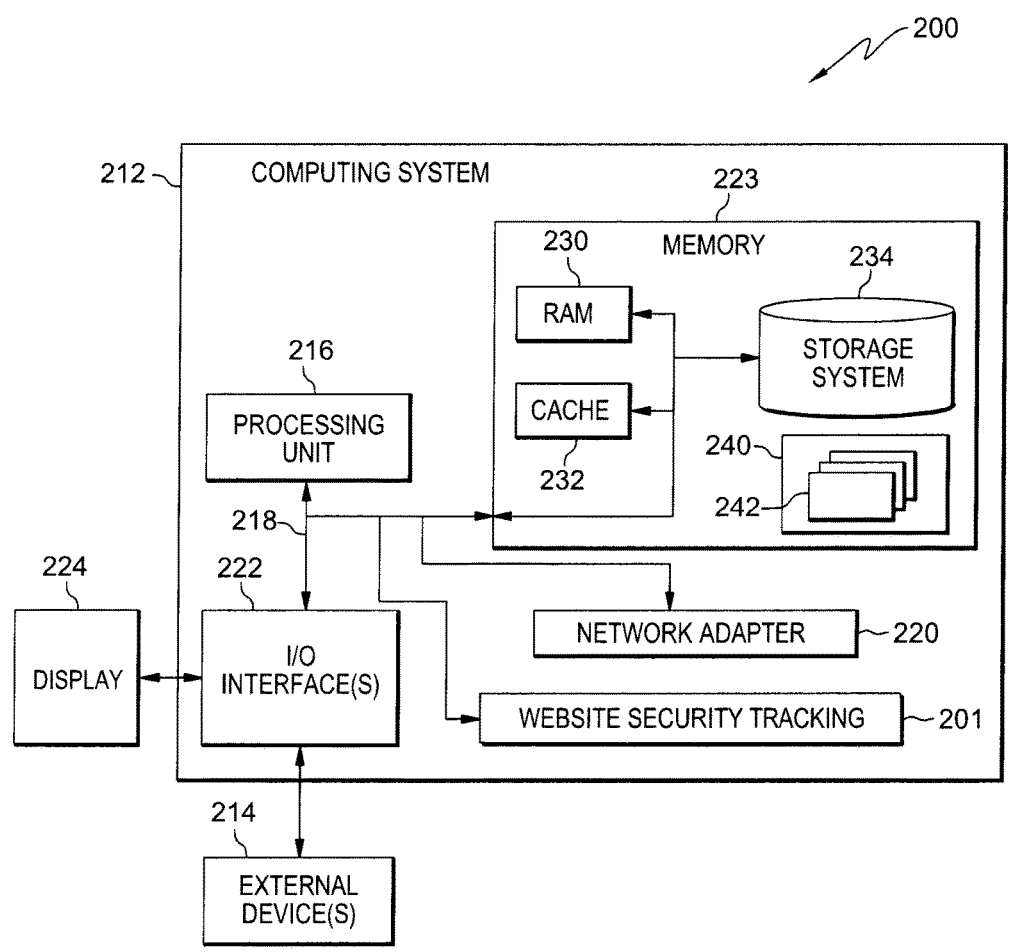
FIG. 2 is a block diagram of a data processing system, or web server, in which website security tracking may be implemented, in accordance with one or more aspects of the present invention.

Before discussing the above-summarized aspects further, FIGS. 1-2 depict exemplary diagrams of data processing environments in which illustrative aspects of the present invention may be implemented. Note in this regard that FIGS. 1-2 are only exemplary, and are not intended to imply any limitation with regard to the environments in which different aspects may be implemented. Many modifications to the depicted environments may be made.

Referring to FIG. 1, a network data processing system 100 is shown, which may include multiple computers, and a network 102. Network 102 may be any medium used to provide communications links between various devices and computers connected together within network data processing system 100. For instance, network 102 may include connections, such as wires, wireless communications links, fiber optic cables, etc.

In the depicted system, servers 104 connect to network 102, along with a central authority 106. As explained further below, central authority 106 may include an analytics system 108 (such as pattern-matching processing), which may facilitate website security tracking, in accordance with one or more aspects of the present invention. In operation, severs 104 may collectively host one or more websites of network data processing system 100 owned or associated with an organization, such as a business or other enterprise. Note that network data processing system 100 may include any number of servers 104 and/or any number of other devices (not shown).

In one or more embodiments, network data processing system 100 may incorporate, or utilize, the Internet, with network 102 representing a potentially worldwide network and gateway that uses the Transmission Control Protocol/Internet Protocol (TCP/IP) suite of protocols to communicate. As known, the Internet includes a backbone of high-speed data communication lines between major nodes or host computers, comprising millions of commercial, governmental, educational and other computer systems that route data and messages. Of course, network data processing system 100 may also be implemented as a number of different types of networks, such as for example, an intranet, a local area network (LAN), a wide area network (WAN), a wireless network, etc. FIG. 1 is intended as one example only, and not as an architectural limitation for the different illustrative aspects of the website security tracking disclosed herein.

In one or more implementations, central authority 106 may be a data processing system, such as a computer. In one or more embodiments, central authority 106 may be a central server of an organization or enterprise owning network data processing system 100. In accordance with one or more aspects of the present invention, central authority 106 includes an analytics system or data analytics 108 to receive data from servers 104 hosting the organization's websites, and determine based thereon, whether one or more suspicious events are related to a security attack on the network. For instance, as described herein, the analytics system 108 may use pattern-matching of one or more characteristics of suspicious events received at multiple websites of the network and/or collected event-specific information associated with the suspicious events in determining a confidence level of whether two or more suspicious events at different websites of the network data processing system 100 are related as part of a common security attack against the network.

Referring to FIG. 2, a block diagram of a data processing system is shown in which illustrative aspects of the present invention may be implemented. Data processing system 200 may be one example of a computer, such as server 104 or central authority 106 in the system of FIG. 1, and may include computer usable program code or instructions implementing processes such as disclosed herein.

As shown, data processing system 200 includes a computing system 212. Examples of well-known computing systems, environments, and/or configurations that may be suitable for use with computer system 212 include, but are not limited to, a workstation, a computer, a server, and the like.

Computing system 212 may be described in the general context of computer system-executable instructions, such as program modules, being executed by a computer system. Generally, program modules may include routines, programs, objects, components, logic, data structures, and so on that perform particular tasks or implement particular abstract data types.

As depicted in FIG. 2, computing system 212, is shown in the form of a general-purpose computing device. The components of computing system 212 may include, but are not limited to, one or more processors or processing units 216, a system memory 223, and a bus 218 that couples various system components including system memory 223 to processor 216.

In one embodiment, processor 216 may be based on the z/Architecture® offered by International Business Machines Corporation, or other architectures offered by International Business Machines Corporation or other companies. z/Architecture® is a registered trademark of International Business Machines Corporation, Armonk, N.Y., USA. One embodiment of the z/Architecture® is described in "z/Architecture® Principles of Operation," IBM Publication No. SA22-7832-10, March 2015, which is hereby incorporated herein by reference in its entirety.

In other examples, it may be based on other architectures, such as the Power Architecture offered by International Business Machines Corporation. One embodiment of the Power Architecture is described in "Power ISA™ Version 2.07B," International Business Machines Corporation, Apr. 9, 2015, which is hereby incorporated herein by reference in its entirety. POWER ARCHITECTURE is a registered trademark of International Business Machines Corporation, Armonk, N.Y., USA. Other names used herein may be registered trademarks, trademarks, or product names of International Business Machines Corporation or other companies.

Bus 218 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computing system 212 may include a variety of computer system readable media. Such media may be any available media that is accessible by computing system 212, and it includes both volatile and non-volatile media, removable and non-removable media.

System memory 223 can include computer system readable media in the form of volatile memory, such as random access memory (RAM) 230 and/or cache memory 232. Computing system 212 may further include other removable/non-removable, volatile/non-volatile computer system storage media. By way of example only, storage system 234 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media could be provided. In such instances, each can be connected to bus 218 by one or more data media interfaces. As described below, memory 223 may include at least one program product having a set (e.g., at least one) of program modules that are configured to carry out the functions of embodiments of the invention.

Program/utility 240, having a set (at least one) of program modules 242, may be stored in memory 232 by way of example, and not limitation, as well as an operating system, one or more application programs, other program modules, and program data. Each of the operating system, one or more application programs, other program modules, and program data or some combination thereof, may include an implementation of a networking environment. Program modules 242 generally carry out the functions and/or methodologies of embodiments of the invention as described herein. Alternatively, a separate, website security tracking system, module, logic, etc., 201 may be provided within computing environment 212.

Computing system 212 may also communicate with one or more external devices 214 such as a keyboard, a pointing device, a display 224, etc.; one or more devices that enable a user to interact with computing system 212; and/or any devices (e.g., network card, modem, etc.) that enable computing system 212 to communicate with one or more other computing devices. Such communication can occur via Input/Output (I/O) interfaces 222. Still yet, computing system 212 can communicate with one or more networks such as a local area network (LAN), a general wide area network (WAN), and/or a public network (e.g., the Internet) via network adapter 220. As depicted, network adapter 220 communicates with the other components of computing system, 212, via bus 218. It should be understood that although not shown, other hardware and/or software components could be used in conjunction with computing system 212. Examples, include, but are not limited to: microcode, device drivers, redundant processing units, external disk drive arrays, RAID systems, tape drives, and data archival storage systems, etc.

Those skilled in the art should note that the depicted system examples of FIGS. 1-2, as well as other examples referenced herein, are not meant to imply architectural limitations.

As noted, aspects of the present invention may be implemented as security tracking modules, such as library code modules, that may be integrated into website code, such as a website framework. A web framework is a software framework designed to support the development of websites or web applications, including web services, web resources, and web APIs. Web frameworks aim to alleviate the overhead associated with common activities performed in website development. For example, website frameworks often provide libraries for database access, templating frameworks, and session management. By providing, for instance, the collecting and providing aspects described herein as part of one or more security tracking modules or libraries, a website developer within an organization may simply integrate the desired modules into the website code, without requiring extensive knowledge of the security aspects implemented by security tracking module(s), in accordance with aspects of the present invention.

Figure 3:
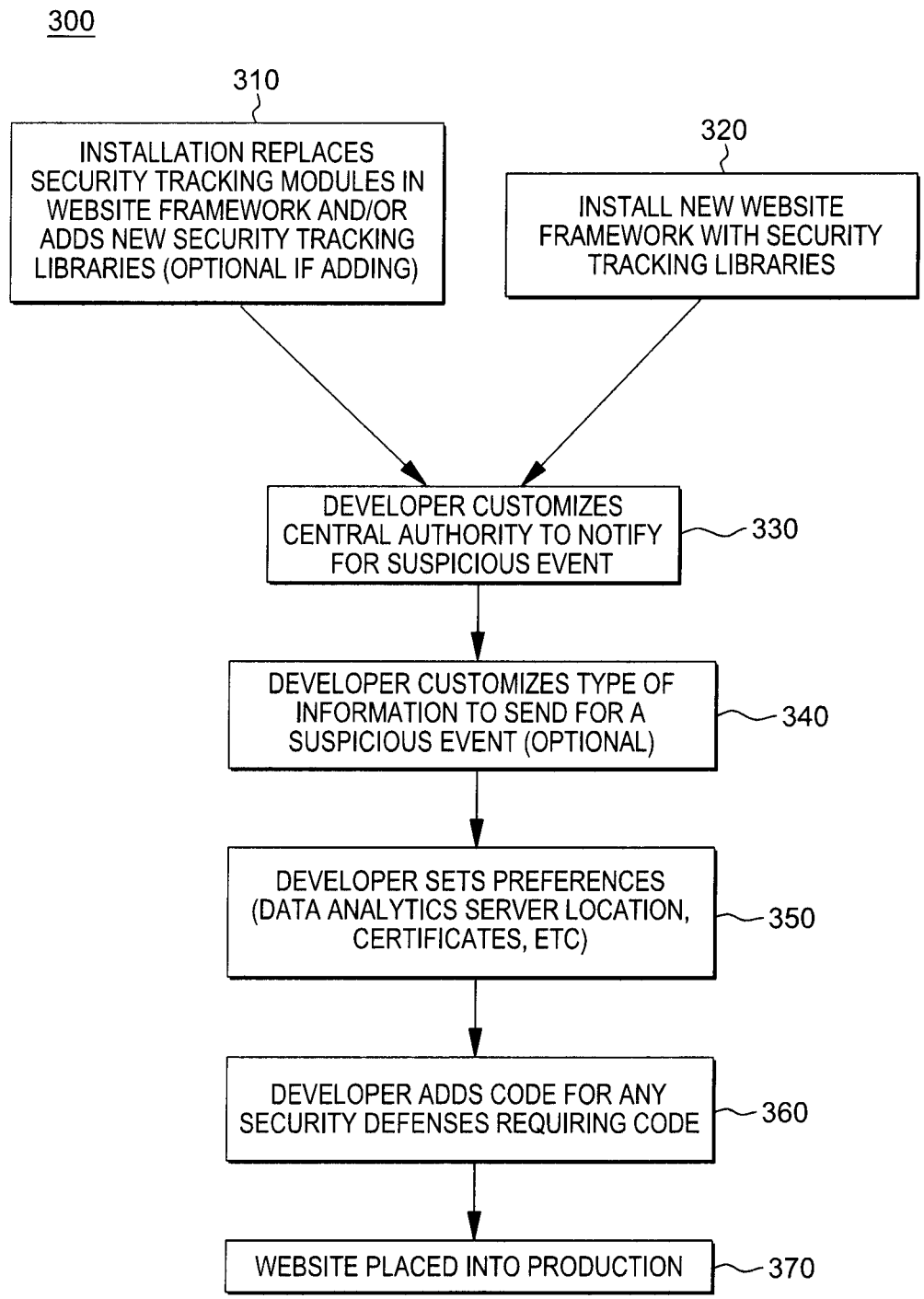
FIG. 3 depicts one embodiment of a process for integrating one or more security tracking modules into website code of a website for website security tracking, in accordance with one or more aspects of the present invention.

FIG. 3 depicts one embodiment of a website code setup process, generally denoted 300, implementing one or more security tracking module(s), in accordance with one or more aspects of the present invention. As illustrated, the setup process may either retrofit or replace one or more security modules in a web framework with security tracking modules such as discussed herein, adding the new security tracking modules, for instance, in new code library modules, if desired 310. Alternatively, during website code development, a website framework may be installed with the desired security tracking module(s) or library code module(s), to provide the facilities described herein 320. As part of installing the security tracking module(s), a developer may be prompted to customize the entity (e.g., central authority) to be notified in the case of a suspicious event 330. In addition, the developer may be provided with the ability to customize the type of event-specific information to send based on occurrence of a suspicious event 340. This process may be optional in that the type of information to be collected and provided to the analytics system may be set, such as by default, within the security tracking module(s). The developer may set preferences, such as the data analytics system location, any certificates, etc., 350. If appropriate, a developer may add additional code for any defense that requires it 360, and once complete, the website tracking security aspect of website development is complete, and the website may be placed into production 370.

Figure 4:
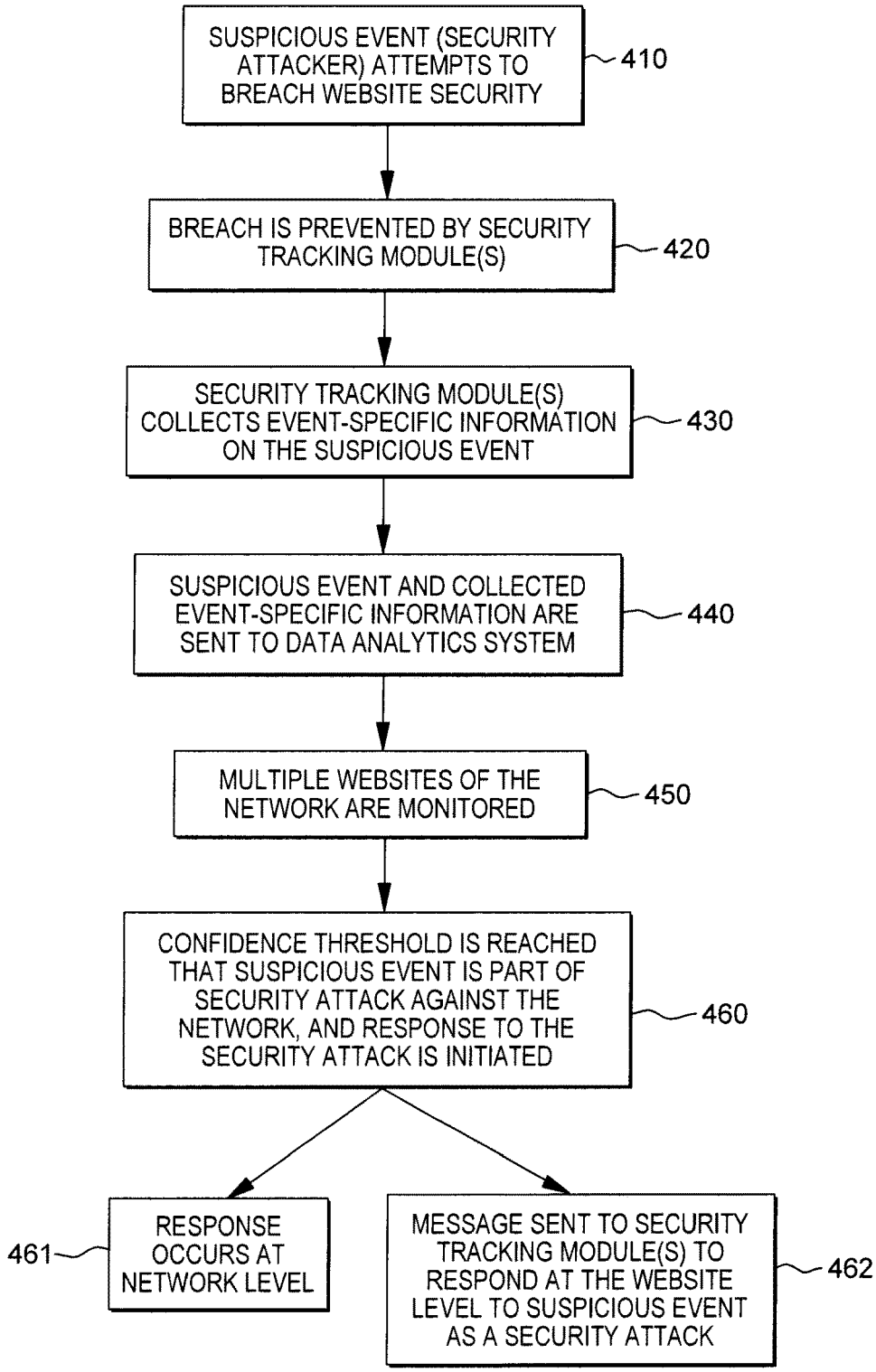
FIG. 4 depicts one embodiment of a process for website security tracking within a network, in accordance with one or more aspects of the present invention.

FIG. 4 depicts one embodiment of an operational or runtime process, generally denoted 400, in accordance with one or more aspects of the present invention. This process assumes that one or more websites of a network have website security tracking code integrated as part of the website code, for instance, as security tracking modules or code library modules, detection, collecting, and sharing processing such as described herein. As illustrated, a suspicious event, such as a security attack, attempts to breach a website's security 410. The attempted breach is prevented by one or more security tracking module(s) 420 integrated or associated with the website code. The security tracking module(s) collects event-specific information on the suspicious event internal to the website 430. Examples of the type of event-specific information collected are provided further below in connection with the detailed embodiment of FIGS. 5A & 5B. The event-specific information collected may depend, for instance, on the type of suspicious event attack encountered. In one or more implementations, at least the user's ID and the website ID may be collected (for instance, stored) at the website.

An indication of the suspicious event (such as the suspicious event itself or a cleansed version of the suspicious event), as well as the collected event-specific information, are sent to the analytics system external to the website 440. The analytics system monitors multiple websites of the network 450, and may receive indications of suspicious events and collected event-specific information from the multiple websites. The analytics system determines, for instance, whether a confidence threshold has been reached that the suspicious event is part of a security attack against the network, and if so, a response to the security attack is initiated 460. The response may include a network-level response 461 and/or a message may be sent to security tracking module(s) at the website(s) to respond to the suspicious event (that is, the security attack) at the website level 462.

As one example of the processing of FIGS. 3 & 4, internal website owners may be provided with one or more security tracking modules or libraries to be called in different places of the website code, dependent on the type of suspicious event at the website. The website owner (or organization) codes the security tracking modules into the website code and connects them so that they can report suspicious events and collected event-specific information to a security service, such as a central authority or analytics system, as described herein.

In one or more implementations, the security tracking module code can detect and clean data from different types of security attacks against the website (such as SQL injection-type attacks, probing known weakness attacks, etc.). If a security attack is detected within received data, then the security attack or suspicious event may be stored at the website with the user ID and the website ID, and the central authority may be notified of the incident, either by the security tracking module itself, or by other website code. In one or more embodiments, on a defined schedule, the collected suspicious event and the event-specific information may be analyzed to determine if there is any correlation between, for instance, a user's ID attempting to breach various sites. Optionally, instead of reporting results on a periodic basis, the reports could be submitted when, for instance, the central authority requests them. Advantageously, the security tracking modules discussed herein can be readily updated as part of the website's framework on a periodic basis, for instance, as additional security threats become known. Additionally, a threshold could be generated for the confidence that an authenticated user has been performing suspicious events, such as security hacking. This can be generated considering the number of websites involved, the frequency of the suspicious events, etc. If the analytics system is confident a user is attacking the internal websites of an organization, the organization can respond with counter-measures, such as: blocking the user's IP address; uploading software to the user which tells the analytics system additional information about the user; uploading a malicious virus to the security attacker's system, etc.

Figure 5A:
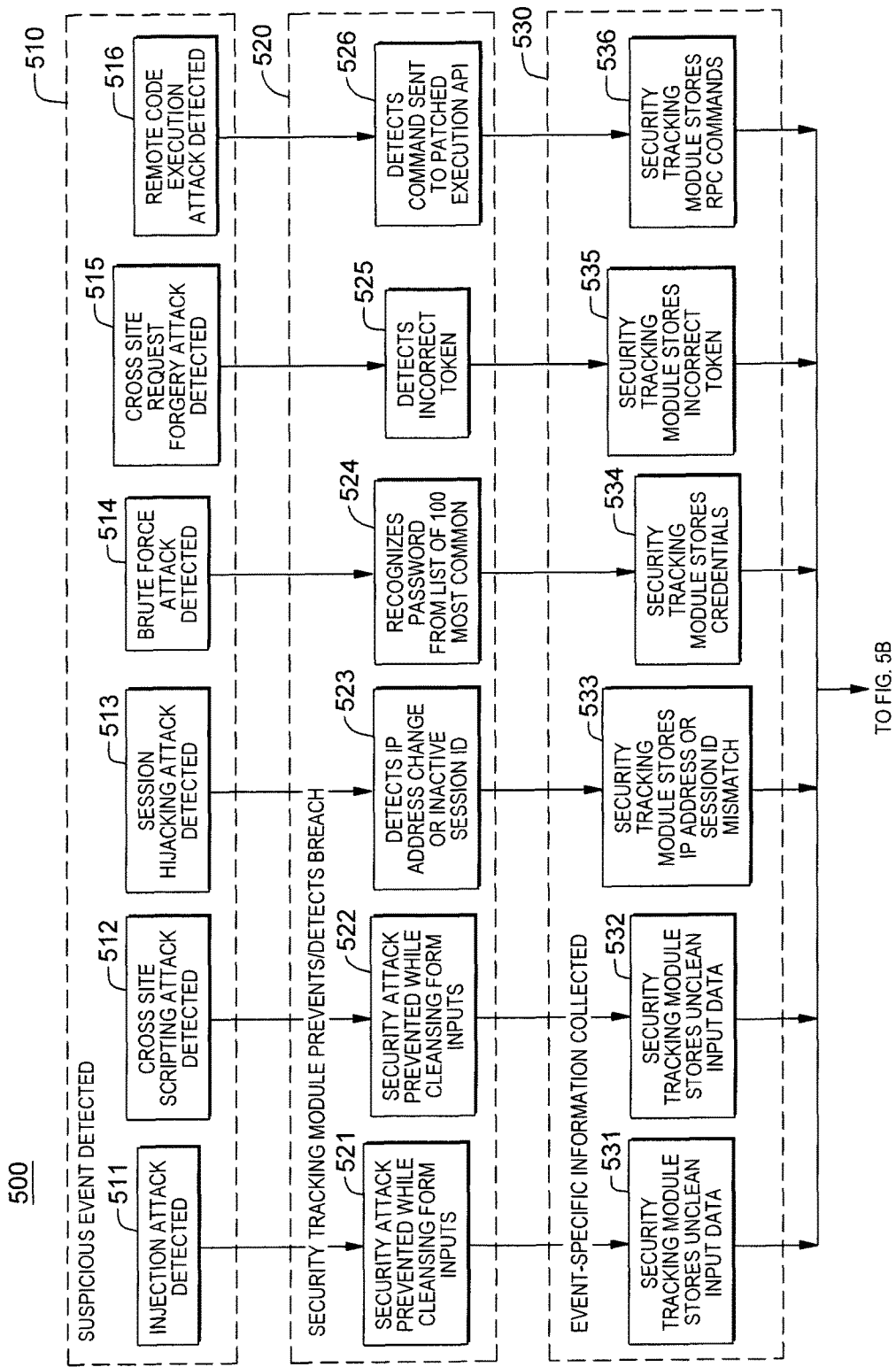
Figure 6:
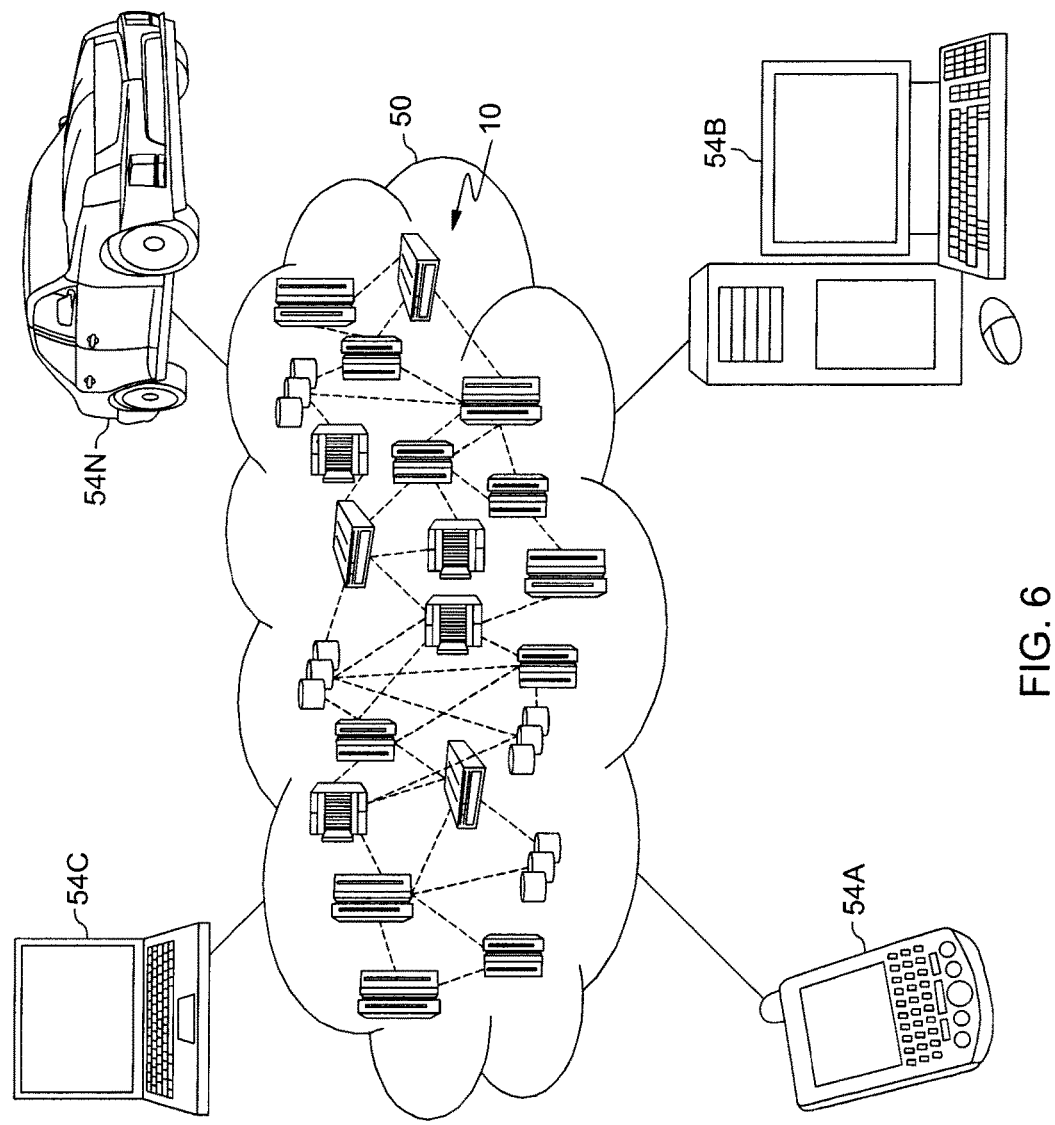
FIG. 6 depicts one embodiment of a cloud computing environment, which may implement or be used in association with one or more aspects of the present invention.

FIGS. 5A & 5B depict a more detailed embodiment of an operational website security tracking process, in accordance with one or more aspects of the present invention. As illustrated, the website security tracking process 500 includes a suspicious event being received at a website of the data processing system network 510. By way of example only, the suspicious event detected may be, for instance, an injection-type attack 511 (such as an SQL injection-type attack), a cross-site scripting-type attack 512, a session hijacking-type attack 513, a brute-force password-type attack 514, a cross-site request forgery-type attack 515, a remote code execution-type attack 516, etc. Those skilled in the art will recognize that other suspicious events may be detected as part of the processing described herein, and that the events of FIG. 5A are provided by way of example only.

In one or more implementations, the detection of the suspicious event may be by website code, such as by one or more security tracking modules integrated into the website code, such as library code modules described herein. For instance, a security tracking module may be provided to address each type of suspicious event noted, with the multiple modules being integrated into the website code as, for instance, filters on a user's interaction with the website. The attempted breach may be prevented or detected by the security tracking module(s) 520. As illustrated, this action may depend upon the type of suspicious event attempting the breach. Where the event is an injection-type attack, the security tracking module prevents the attack, while cleansing the form inputs affected by the attack 521. Similarly, where the event is a cross-site scripting-type attack, the security tracking module(s) prevents the security attack, while cleansing the affected form inputs 522. In one or more embodiments, where the suspicious event is a session hijacking-type attack, the security tracking module(s) may detect an IP address change, or the use of an inactive session ID 523 at the website. If a brute-force password-type attack is attempted, the security tracking module(s) may compare the password against, for instance, a list of 100 most common passwords used, for instance, in a brute-force password-type attack 524. If a cross-site request forgery-type attack is involved, then the security tracking module(s) may, as part of the processing, detect an incorrect token being employed at the website 525. If a remote code execution-type attack is attempted, then the security tracking module(s) may be provided to detect a command sent to a patched execution API 526.

General information on the suspicious event, including the suspicious event itself, may be collected, along with event-specific information relating to the event 530. For instance, the event-specific information may include storing the uncleansed input data 531, 532, where the suspicious event is an injection-type attack or cross-site scripting-type attack.

By way of further example, the stored event-specific information may be an IP address or session ID mismatch 533 in the case that the suspicious event is a session hijacking-type attack. Where a brute-force password-type attack is detected, the security tracking module(s) may store credentials of the user attempting the attack 534. If a cross-site request forgery-type attack is detected, then the security tracking module(s) may store the incorrect token 535, while if a remote code execution-type attack is detected, the security tracking module(s) may store RPC commands 536 associated with the security attack. As noted, those of ordinary skill in the art will understand that the specific suspicious events identified in FIGS. 5A & 5B are provided by way of example only, and not by way of limitation. Other security attacks may be addressed using appropriate security tracking modules integrated into the website's code, as discussed herein.

In one or more implementations, an indication of the suspicious event may be sent to the central data analytics system, along with event-specific information related to the suspicious event 540. The analytics system may receive indications of suspicious events from multiple websites of the data processing system network, along with external traffic information or contextual information at the time of the suspicious event. This contextual information may be, for instance, a general representation of the health of the data processing system network at the time of the events.

The suspicious events, along with the collected event-specific information dependent on the type of suspicious event, may be used as inputs to, for instance, a data analytic pattern-matching process implemented, in one or more embodiments by, for instance, a neural network 550. The data analytic pattern-matching process may, for example, provide a confidence level on whether suspicious events match and are representative of a security attack across multiple websites of the data processing system network. Where a pattern-matching threshold is triggered indicative of a coordinated security attack on the network, a response may be initiated 560. This response may depend, in one or more implementations, on the confidence level with which the analytics system has determined the existence of a coordinated security attack. If the confidence level is high, then a response may be provided at the network level 561. For instance, if the confidence level is high that multiple suspicious events are related as a coordinated attack, then the outermost firewall of the network may be provided with the attacker's IP address such that the IP address is blocked from access into the network. If confidence is not as high, but the analytics system still determines that the suspicious events may be related as a coordinated attack, then a message may be sent to the security tracking module(s) within the individual websites to respond to the event, such as by, for instance, revoking a session ID associated with the suspicious event.

By way of further explanation, assume that the suspicious event is an SQL injection-type attack. In such a case, the security attacker attempts to input SQL data from a form that is posted to the website application. Responsive to the suspicious event, the website code, and in particular, the security tracking module(s) reads in form data (e.g., $formData=$this→post_input('myFieldName');). The security tracking module(s) may cleanse the form data to remove or deactivate the SQL key words, and the security tracking module(s) may collect the information about the suspicious event (IP address, browser information, data/time, referring page, etc.), SQL queries from the attack, and for instance, the event-type (SQL_injection). The security tracking module(s) sends the information to, for instance, the analytics system, which receives similar events from other websites within the data processing system network. As explained above, the data analytics system is configured to analyze by, for instance, pattern-matching, one or more aspects of the received data across websites to determine, for instance, a confidence level on whether a suspicious event correlates across websites as a security attack on the network, and if so, an appropriate response is initiated.

As another example, where the suspicious event is a brute-force password-type attack, an attacker may be attempting to use a list of common passwords, such as a list of 100 common passwords to break into an account at a website. In one or more implementations, the website code has incorporated a third party password storage library to use within the website's framework, for instance, when managing user authentication (e.g, $isValidUser=$this→password_vault→verify($userid, $password);). Responsive to such a suspicious event, the security tracking module(s) may prevent the user from using passwords from the list of most common passwords, in any attempt to authenticate the user's credentials. Upon a failure, the module(s) may determine whether the submitted password is on the list of most common passwords with, for instance, the list being updated at regular intervals. The security tracking module(s) may report information about a suspicious event (IP address, browser information, date/time, referring page, etc.), along with the event-type of brute_force_password to, for instance, the analytics system. As part of this, event-specific information, such as the credentials employed in the suspicious event, may be reported to the analytics system as well.

As a further example, a source code revelation-type attack, similar to a remote code execution-type attack, may be received at a website. In this type of attack, the security attacker is attempting to look into directories to reveal source code for the website. The website has security code incorporated therein to detect such an attack, and may prompt the security tracking module(s) to return, for instance, a 040 error. The security tracking module(s) may report information about the attacker (such as IP address, browser information, date/time, referring page, etc.), with the event type identified as directory_list. This information may be provided to the analytics system for comparison across multiple websites of the network, as described herein.

Advantageously, those skilled in the art will note from the above description that provided herein, in one or more aspects, are security tracking module(s) or security library module(s), which are provided to website developers within an organization. A developer employs the modules by integrating them into website code based on guidance provided with the modules. The website tracking modules may perform, for instance, security functions (such as XSS or SQL injection filtering), and/or internal monitoring functions to look for suspicious events at the website. The security tracking module(s) advantageously reports data, including an indication of the suspicious event and the event-specific information collected at the website, back to a central authority or analytics system. The information may be reported back soon after occurring, or on a regular basis, or when requested by the analytics system. The data will provide support for detecting a security breach on the network. Further, the security tracking module(s) could be wired into a website's platform update facility, so that as new security threats become known, the security tracking module(s) may be automatically updated for inclusion in the website code. Advantageously, event-specific information relating to a suspicious event or security attack is captured at the website before, for instance, cleansed data packets are forwarded from the web site within the network environment. By capturing this information, the central authority, such as the analytics system, is able to correlate the event with a higher degree of confidence to suspicious events related as part of a common security attack against the network.

One or more aspects may relate to or use cloud computing.

It is understood in advance that although this disclosure includes a detailed description on cloud computing, implementation of certain teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

A cloud computing node may include a computer system/server, such as the one depicted in FIGS. 1-2, wherein the computer system/server may be practiced in distributed cloud computing environments where tasks are performed by remote processing devices that are linked through a communications network. In a distributed cloud computing environment, program modules may be located in both local and remote computer system storage media including memory storage devices. The depicted computer system/server is capable of being implemented and/or performing any of the functionality set forth hereinabove.

Figure 7:
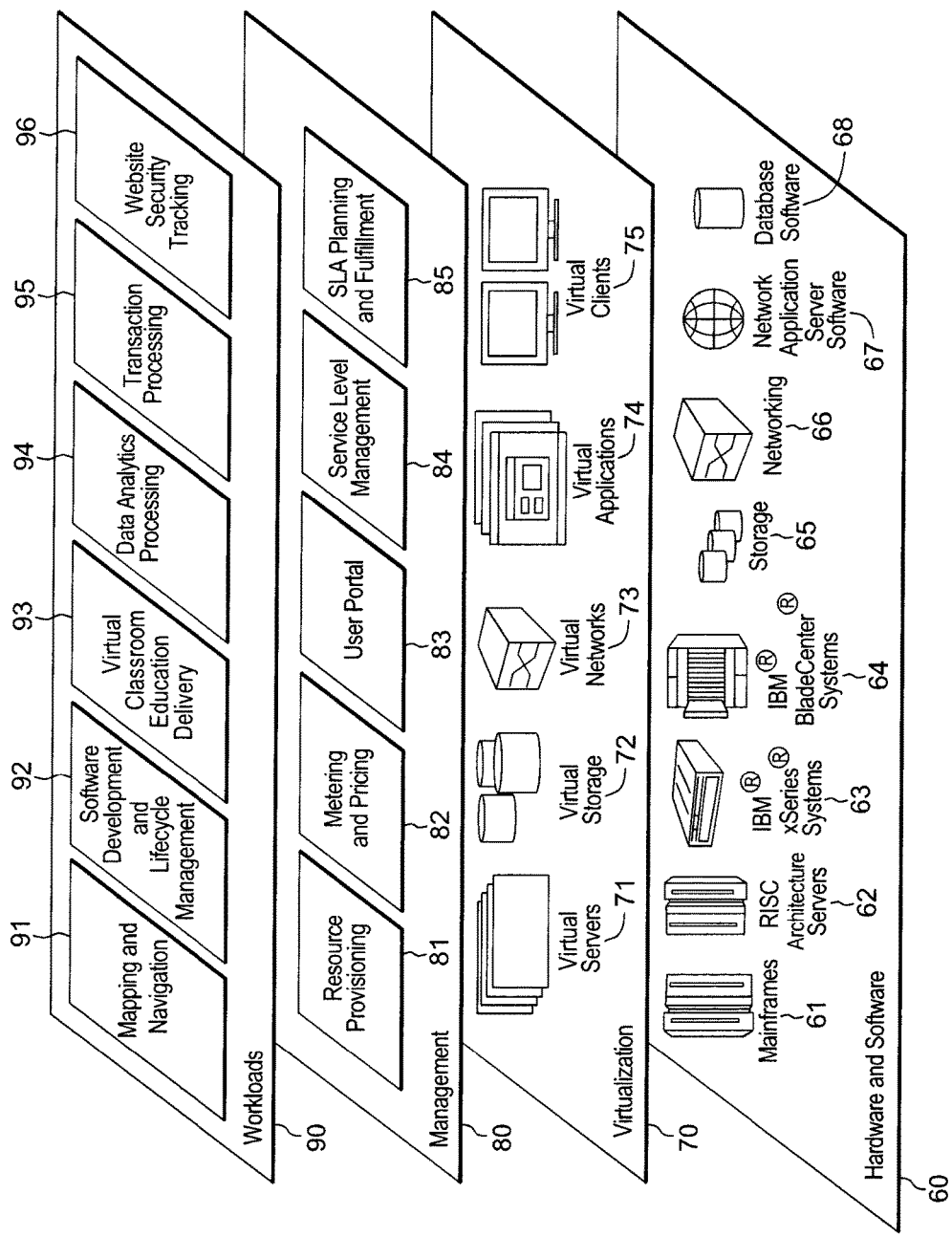
FIG. 7 depicts an example of extraction model layers, which facilitate or implement website security tracking, in accordance with one or more aspects of the present invention.

Referring now to FIG. 7, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Referring now to FIG. 8, a set of functional abstraction layers provided by cloud computing environment 50 is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and website security tracking processing 96.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more aspects. As one example, the deploying of an application comprises providing computer infrastructure operable to perform one or more aspects.

As a further aspect, a computing infrastructure may be deployed comprising integrating computer readable code into a computing system, in which the code in combination with the computing system is capable of performing one or more aspects.

As yet a further aspect, a process for integrating computing infrastructure comprising integrating computer readable code into a computer system may be provided. The computer system comprises a computer readable medium, in which the computer medium comprises one or more aspects. The code in combination with the computer system is capable of performing one or more aspects.

The descriptions of the various embodiments of the present invention have been presented for purposes of illustration, but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The present invention may be a system, a method, and/or a computer program product at any possible technical detail level of integration. The computer program product may include a computer readable storage medium (or media)

having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form contain, such as "contains" and "containing") are open-ended linking verbs. As a result, a method or device that "comprises", "has", "includes" or "contains" one or more steps or elements possesses those one or more steps or elements, but is not limited to possessing only those one or more steps or elements. Likewise, a step of a method or an element of a device that "comprises", "has", "includes" or "contains" one or more features possesses those one or more features, but is not limited to possessing only those one or more features. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of one or more aspects of the invention and the practical application, and to enable others of ordinary skill in the art to understand one or more aspects of the invention for various embodiments with various modifications as are suited to the particular use contemplated.

What is claimed is:

1. A method of facilitating processing within a network including multiple web servers, the method comprising:

for each web server of the multiple web servers in the network, executing respective website code implementing, at least in part, at least one website, the website code including at least one security attack tracking module integrated therein as part of the at least one website's framework;

based on the executing, detecting by a web server of the multiple web servers a suspicious event at the web server indicative of an attempted security attack against the web server, and blocking by the web server the suspicious event at the web server;

based on the detecting, collecting event-specific information by the web server relating to the suspicious event at the web server along with the blocking of the suspicious event by the web server, the collecting including:

executing the at least one security attack tracking module integrated into the website code of the web server to ascertain and store the event-specific information at the web server, the web server being one web server of the multiple web servers of the network;

based on the detecting and the collecting, providing by the web server an indication of the suspicious event, and the collected event-specific information, to an analytics system external to the web server, the indication of the suspicious event comprising the suspicious event itself or a cleansed version of the suspicious event, the analytics system configured to receive indications of suspicious events from the multiple web servers and configured to determine, based at least in part on the indications of the suspicious events and the collected event-specific information relating to the suspicious events, a confidence level of whether the suspicious event is part of a common security attack against the network, and to initiate one or more responsive actions at a network-level or a web-server-level to the attempted security attack, beyond the blocking of the suspicious event, that depend, in part, on the confidence level; and receiving, by the web server, an indication from the analytics system based on the confidence level that the web server is to take a web-server-level responsive action, of the one or more responsive actions, to the attempted security attack, and based on receiving the indication, executing by the web server the web-server-level responsive action based on the attempted security attack.

2. The method of claim 1, wherein the suspicious event at the web server is an injection-type attack at the web server, and the collecting comprises internally collecting uncleansed input data of the injection-type attack as, at least in part, the event-specific information.

3. The method of claim 1, wherein the suspicious event at the web server is a cross-site scripting-type attack, and the collecting comprises internally collecting uncleansed input data of the cross-site scripting-type attack as, at least in part, the event-specific information.

4. The method of claim 1, wherein the suspicious event at the web server is a session hijacking-type attack, and the collecting comprises internally collecting data selected from a group consisting of an Internet Protocol (IP) address and session identifier (ID) mismatch, of the session hijacking-type attack as, at least in part, the event-specific information.

5. The method of claim 1, wherein the suspicious event at the web server is a brute-force password-type attack, and the collecting comprises internally collecting credentials associated with the brute-force password-type attack as, at least in part, the event-specific information.

6. The method of claim 1, wherein the suspicious event at the web server is a cross-site request forgery-type attack, and the collecting comprises internally collecting an incorrect token of the cross-site request forgery-type attack as, at least in part, the event-specific information.

7. The method of claim 1, wherein the suspicious event at the web server is a remote code execution-type attack, and the collecting comprises internally collecting remote procedure call (RPC) commands of the remote code execution-type attack as, at least in part, the event-specific information.

8. The method of claim 1, further comprising:

collecting the event-specific information relating to multiple suspicious events at the multiple web servers, the collecting comprising executing the at least one security attack tracking module integrated into website code of each web server of the multiple web servers to store at the multiple web servers the respective event-specific information relating to the multiple suspicious events; and providing by the multiple web servers indications of the suspicious events and the collected event-specific information thereon to the analytics system, the analytics system to identify, by pattern-matching at least some of the multiple suspicious events and the collected event-specification information, whether at least two suspicious events of the multiple suspicious events are related as part of the common security attack against the network.

9. The method of claim 8, further comprising responding to the at least two suspicious events at the network level based on the analytics system determining that the confidence level indicates that the at least two suspicious events are part of the common security attack against the network.

10. The method of claim 8, further comprising responding to the at least two suspicious events by the respective web servers receiving those events based on the confidence level indicating that the at least two suspicious events may be part of the common security attack against the network.

11. The method of claim 1, wherein the at least one security attack tracking module comprises at least one security library module, the at least one security library module performing, at least in part, an action selected from the group consisting of providing a security function responsive to the suspicious event, and monitoring internal functions of the web server to identify the suspicious event.

12. The method of claim 1, wherein the collecting occurs internally at the web server before the web server passes cleansed packets based on the suspicious event on within the network.

13. The method of claim 1, wherein the suspicious event includes an associated user identification (ID), and the analytics system to determine, based at least in part on the user ID, whether the suspicious event is part of the common security attack against the network.

14. A system of website security tracking within a network including multiple web servers, the system comprising:
    a memory; and
    a processing circuit communicatively coupled with the memory, wherein the system performs a method comprising:
        for each web server of the multiple web servers in the network, executing respective website code implementing, at least in part, at least one website, the website code including at least one security attack tracking module integrated therein as part of the at least one website's framework;
        based on the executing, detecting by a web server of the multiple web servers a suspicious event at the web server indicative of an attempted security attack against the web server, and blocking by the web server the suspicious event at the web server;
        based on the detecting, collecting-event-specific information by the web server relating to the suspicious event at the web server along with the blocking of the suspicious event by the web server, the collecting including:
            executing the at least one security attack tracking module integrated into the website code of the web server to ascertain and store the event-specific information at the web server, the web server being one web server of the multiple web servers of the network;
        based on the detecting and the collecting, providing by the web server an indication of the suspicious event, and the collected event-specific information, to an analytics system external to the web server, the indication of the suspicious event comprising the suspicious event itself or a cleansed version of the suspicious event, the analytics system configured to receive indications of suspicious events from the multiple web servers and configured to determine, based at least in part on the indications of the suspicious events and the collected event-specific information relating to the suspicious events, a confidence level of whether the suspicious event is part of a common security attack against the network, and to initiate one or more responsive actions at a network-level or a web-server-level to the attempted security attack, beyond the blocking of the suspicious event, that depend, in part, on the confidence level; and
        receiving, by the web server, an indication from the analytics system based on the confidence level that the web server is to take a web-server-level responsive action, of the one or more responsive actions, to the attempted security attack, and based on receiving the indication, executing by the web server the web-server-level responsive action based on the attempted security attack.

15. The system of claim 14, wherein the suspicious event and the collecting are selected from a group consisting of:
    the suspicious event at the web server is an injection-type attack at the web server, and the collecting comprises internally collecting uncleansed input data of the injection-type attack as, at least in part, the event-specific information;
    the suspicious event at the web server is a cross-site scripting-type attack, and the collecting comprises internally collecting uncleansed input data of the cross-site scripting-type attack as, at least in part, the event-specific information;
    the suspicious event at the web server is a session hijacking-type attack, and the collecting comprises internally collecting data selected from a group consisting of an Internet Protocol (IP) address and session identifier (ID) mismatch, of the session hijacking-type attack as, at least in part, the event-specific information;
    the suspicious event at the web server is a brute-force password-type attack, and the collecting comprises internally collecting credentials associated with the brute-force password-type attack as, at least in part, the event-specific information;
    the suspicious event at the web server is a cross-site request forgery-type attack, and the collecting comprises internally collecting an incorrect token of the cross-site request forgery-type attack as, at least in part, the event-specific information; or
    the suspicious event at the web server is a remote code execution-type attack, and the collecting comprise internally collecting remote procedure call (RPC) commands of the remote code execution-type attack as, at least in part, the event-specific information.

16. The system of claim 14, further comprising:
    collecting the event-specific information relating to multiple suspicious events at the multiple web servers, the collecting comprising executing the at least one security attack tracking module integrated into website code of each web server of the multiple web servers to store at the multiple web servers the respective event-specific information relating to the multiple suspicious events; and
    providing by the multiple web servers indications of the suspicious events and the collected event-specific information thereon to the analytics system, the analytics system to identify, by pattern-matching at least some of the multiple suspicious events and the collected event-specification information, whether at least two suspicious events of the multiple suspicious events are related as part of the common security attack against the network.

17. The system of claim 16, further comprising responding to the confidence level indicates that the at least two suspicious events at the network level based on the analytics system determining that the at least two suspicious events are part of the common security attack against the network.

18. The system of claim 16, further comprising responding to the at least two suspicious events by the respective web servers receiving those events based on the confidence level indicating that the at least two suspicious events may be part of the common security attack against the network.

19. The system of claim 14, wherein the at least one security attack tracking module comprises at least one security library module, the at least one security library module performing, at least in part, an action selected from the group consisting of providing a security function responsive to the suspicious event, and monitoring internal functions of the web server to identify the suspicious event.

20. A computer program product for website security tracking within a network including multiple web servers, the computer program product comprising:
  a non-transitory computer readable storage medium readable by a processor circuit and storing instructions for execution by the processing circuit for performing a method comprising:
    for each web server of the multiple web servers in the network, executing respective website code implementing, at least in part, at least one website, the website code including at least one security attack tracking module integrated therein as part of the at least one website's framework;
    based on the executing, detecting by a web server of the multiple web servers a suspicious event at the web server indicative of an attempted security attack against the web server, and blocking by the website the suspicious event at the web server;
    based on the detecting, collecting event-specific information by the web server relating to the suspicious event at the web server along with the blocking of the suspicious event by the web server, the collecting including:
      executing the at least one security attack tracking module integrated into the website code of the web server to ascertain and store the event-specific information at the web server, the web server being one web server of the multiple web servers of the network;
    based on the detecting and the collecting, providing by the web server an indication of the suspicious event, and the collected event-specific information, to an analytics system external to the web server, the indication of the suspicious event comprising the suspicious event itself or a cleansed version of the suspicious event, the analytics system configured to receive indications of suspicious events from the multiple web servers and configured to determine, based at least in part on the indications of the suspicious events and the collected event-specific information relating to the suspicious events, a confidence level of whether the suspicious event is part of a common security attack against the network, and to initiate one or more responsive actions at a network-level or a web-server-level to the attempted security attack, beyond the blocking of the suspicious event, that depend, in part, on the confidence level; and
    receiving, by the web server, an indication from the analytics system based on the confidence level that the web server is to take a web-server-level responsive action, of the one or more responsive actions, to the attempted security attack, and based on receiving the indication, executing by the web server the web-server-level responsive action based on the attempted security attack.

\* \* \* \* \*